United States Patent
Borchert et al.

(10) Patent No.: US 9,956,714 B2
(45) Date of Patent: May 1, 2018

(54) METHOD OF PRODUCING A HOLLOW BODY FROM THERMOPLASTIC MATERIAL

(71) Applicant: Kautex Textron GmbH & Co. KG, Bonn (DE)

(72) Inventors: Matthias Borchert, Bonn (DE); Klaus Gebert, Willich (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 0 days. days.

(21) Appl. No.: 14/647,407

(22) PCT Filed: Nov. 20, 2013

(86) PCT No.: PCT/EP2013/074221
§ 371 (c)(1),
(2) Date: May 26, 2015

(87) PCT Pub. No.: WO2014/079851
PCT Pub. Date: May 30, 2014

(65) Prior Publication Data
US 2015/0306807 A1   Oct. 29, 2015

(30) Foreign Application Priority Data

Nov. 26, 2012   (DE) .......................... 10 2012 023 035

(51) Int. Cl.
*B29C 49/42* (2006.01)
*B29C 49/60* (2006.01)
(Continued)

(52) U.S. Cl.
CPC .......... *B29C 49/4273* (2013.01); *B29C 49/20* (2013.01); *B29C 49/58* (2013.01);
(Continued)

(58) Field of Classification Search
CPC ...... B29C 2049/0057; B29C 2049/048; B29C 2049/2008; B29C 2049/2021;
(Continued)

(56) References Cited

U.S. PATENT DOCUMENTS 5,565,165 A  * 10/1996  Matsuhashi ............. B29C 49/60
                                                              264/526
5,762,858 A     6/1998  Maeda et al.
(Continued)

FOREIGN PATENT DOCUMENTS

DE          2541765 A1  *  3/1977  ............. B29C 49/20
DE         19600872 A1      7/1997
(Continued)

OTHER PUBLICATIONS

English language PCT International Search Report mailed Mar. 6, 2014, received in corresponding PCT Application No. PCT/EP13/74221, 2 pgs.
English language PCT Written Opinion mailed Mar. 6, 2014, received in corresponding PCT Application No. PCT/EP13/74221, 3 pgs.

*Primary Examiner* — Philip Tucker
*Assistant Examiner* — Vicki Wu
(74) *Attorney, Agent, or Firm* — Grossman, Tucker, Perreault & Pfleger, PLLC

(57) ABSTRACT

The invention relates to a method for producing hollow bodies from thermoplastic material comprising the shaping of at least one tubular preform or at least two two-dimensional, web-like preforms of plasticated thermoplastic material into a substantially closed hollow body, for example in the form of a fuel tank for motor vehicles.

13 Claims, 1 Drawing Sheet

(51) Int. Cl.
*B29C 49/20* (2006.01)
*B29C 49/58* (2006.01)
*B29L 31/00* (2006.01)
*B29C 49/00* (2006.01)
*B29C 49/04* (2006.01)
*B29K 101/12* (2006.01)

(52) U.S. Cl.
CPC ...... *B29C 49/60* (2013.01); *B29C 2049/0057* (2013.01); *B29C 2049/048* (2013.01); *B29C 2049/2008* (2013.01); *B29C 2049/2021* (2013.01); *B29C 2049/5837* (2013.01); *B29C 2049/609* (2013.01); *B29C 2049/6009* (2013.01); *B29C 2791/006* (2013.01); *B29C 2791/007* (2013.01); *B29K 2101/12* (2013.01); *B29L 2031/7172* (2013.01)

(58) Field of Classification Search
CPC .... B29C 2049/5837; B29C 2049/6009; B29C 49/60; B29C 2791/007; B29C 2791/006; B29C 2049/609; B29C 49/58; B29C 49/20; B29C 49/4273; B29K 2101/12; B29L 2031/7172
USPC .......................................................... 156/245
See application file for complete search history.

(56) References Cited

U.S. PATENT DOCUMENTS

| | | | |
|---|---|---|---|
| 6,978,802 B2 | 12/2005 | Hagano et al. | |
| 7,166,253 B2 | 1/2007 | Van Schaftingen et al. | |
| 8,603,280 B2* | 12/2013 | Borchert | B29C 51/12 156/243 |
| 9,352,506 B2 | 5/2016 | Borchert et al. | |
| 2008/0061066 A1* | 3/2008 | Borchert | B32B 27/00 220/562 |
| 2008/0061470 A1* | 3/2008 | Borchert | B29C 49/20 264/250 |
| 2008/0078761 A1* | 4/2008 | Borchert | B65D 90/0006 220/4.13 |
| 2008/0149642 A1* | 6/2008 | Borchert | B29C 49/20 220/562 |
| 2009/0308881 A1* | 12/2009 | Eulitz | B29C 66/61 220/660 |

FOREIGN PATENT DOCUMENTS

| | | |
|---|---|---|
| DE | 10231886 A1 | 2/2004 |
| DE | 102006024064 A1 | 11/2007 |
| DE | 102006042065 A1 | 3/2008 |
| DE | 200610059799 A1 | 6/2008 |
| WO | 2007090453 A3 | 8/2007 |

* cited by examiner

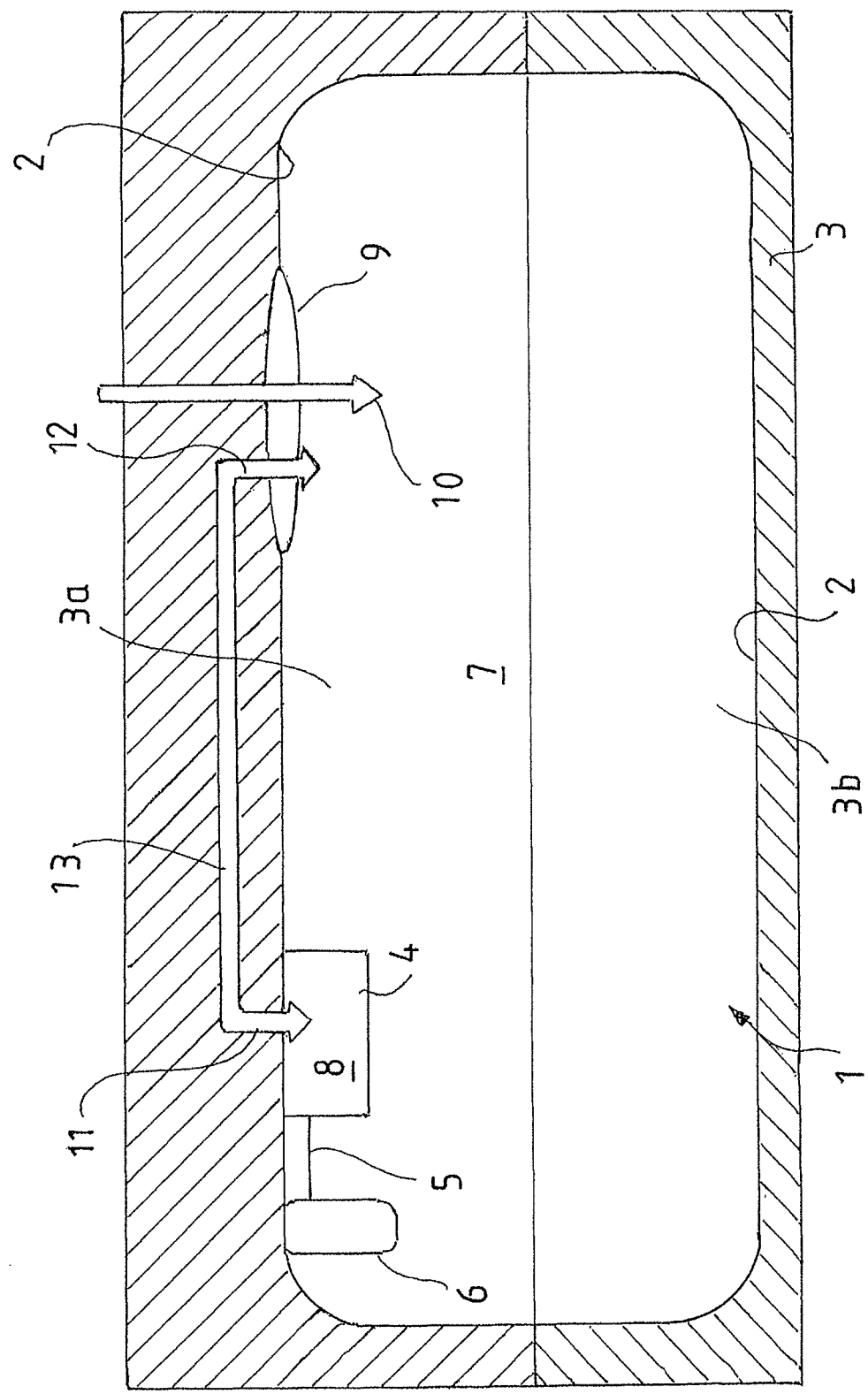

METHOD OF PRODUCING A HOLLOW BODY FROM THERMOPLASTIC MATERIAL

The invention relates to a method for producing hollow bodies from thermoplastic material comprising the shaping of at least one tubular preform or at least two two-dimensional, web-like preforms of plasticated thermoplastic material into a substantially closed hollow body, for example in the form of a fuel tank for motor vehicles.

The invention relates in particular to a method for producing hollow bodies from thermoplastic material by extrusion blow molding.

In the case of the extrusion blow molding of plastic products, molding tools which comprise two mold halves that are formed to complement one another and together bound a mold cavity are used. A thermoplastic extrudate, in the form of a parison or one or more web-like or sheet-like preforms, is brought between the opened halves of the tool. Within the tool, the preform or preforms are made to lie against the inner wall of the cavity formed by the tool, so that the finished article has an outer shape that corresponds to the inner contour of the molding tool. The re-forming of the preform or preforms within the cavity of the tool takes place either by widening of the preforms by means of gas pressure or by making the preforms lie against the inner wall of the tool by means of negative pressure, which is applied by way of channels in the mold wall.

In the case of known methods for producing hollow plastic bodies, for example by rotational sintering or by injection molding or extrusion blow molding from tubular or web-like extrudates, methods that have proven successful in particular are methods for the extrusion blow molding of hollow bodies in which two-dimensional semifinished products are first shaped into half-shells, which are then brought into contact with one another in the same tool along a running-around periphery and are joined together to form a closed hollow body. Such a method is known for example from DE 102 31 866 A1. These methods have the advantage that inserts to be introduced into the hollow body can be introduced into the hollow body already during production, directly after the shaping of the shells and before the joining together of the shells.

In particular in the case of the production of fuel tanks from thermoplastic material, such a method has proven successful, especially in fuel tanks, apart from the feed units that are usually to be provided for the fuel to the internal combustion engine of a vehicle, venting systems of varying degrees of complexity with expansion tanks, bubble vessels, venting lines and venting valves are to be provided.

Such a method is also described inter alia in DE 10 2006 006 469 A1.

In particular, the introduction into the hollow body of inserts that define or form self-contained part-volumes within the hollow body may be critical in the case of production by means of the previously mentioned extrusion blow molding method from web-like preforms, since the differential pressure to be applied during the method for the shaping or re-forming of the preforms within the blow molding tool also acts on the inserts to be introduced into the hollow body, which may lead to the destruction of sealing elements and valves or to the collapse of inserts such as lines, bubble vessels, expansion tanks or the like.

The invention is therefore based on the object of providing a method for producing a hollow body from thermoplastic material that makes allowance for the problems described above.

The object is achieved by a method for producing a hollow body from thermoplastic material, comprising the following method steps:

providing at least one tubular or web-like preform of thermoplastic material on a multipart blow molding tool, introducing the preform into the cavities of the blow molding tool, molding the preform into shells, joining at least one insert to at least one shell within the blow molding tool, the insert defining a part-volume that is closed off with respect to a main volume of the hollow body to be produced, joining together the shells by closing the blow molding tool and applying pressure to the main volume enclosed by the hollow body, wherein a pressure equalization with the part-volume is brought about parallel to the application of pressure to the main volume.

For the purposes of the invention, web-like includes both preforms that are in the form of a shell and preforms that are substantially elongate or spread out in a plane.

In principle, such a pressure equalization may be established for example by the part-volume being subjected to pressure at the same time as the main volume, for example by branching off a part-stream of the pressure medium during the application of pressure to the main volume.

With preference, however, it is envisaged according to the invention to use the main volume of the hollow body itself as an equalizing vessel for the part-volume. For this purpose, it is provided for example that the pressure equalization takes place by the part-volume within the closed blow molding tool being connected at least for a time to the main volume by way of at least one bypass line.

The variant that has been used in practice by the applicant up to now for preventing the destruction of inserts when differential pressure is applied during the blow molding process has been to leave from the outset the inserts that are to be introduced into the hollow body as a system that is open to the main volume and to produce a closing off from the main volume only after completion of the hollow body.

A disadvantage of such a procedure is that such a closing off of the insert concerned after completion of the hollow body has to be carried out manually, to be precise by manipulations through one or more container openings, which is laborious and expensive and as a result of which it is made more difficult to check that the insert has been securely closed off.

By contrast, the method according to the invention envisages introducing the insert concerned as a substantially self-contained part-volume into the hollow body and bringing about a pressure equalization within the tool directly before or during the application of pressure to the main volume. This can be accomplished in a relatively easy way in particular if a pressure equalization between the part-volume and the main volume is established, thereby also excluding dynamic effects that would occur if the part-volume were parallel to the main volume.

The provision of one or more preforms to which a pressure medium is applied, as provided by the invention, may take place both by cutting open a previously extruded single- or multi-layer parison at diametrically opposed locations, and by extruding web-like preforms from one or more slot dies (flat film dies) that are spaced apart from one another. For this purpose, an extrusion head according to DE 10 2006 042 064 A1 may be used for example.

The method may for example also comprise the extrusion of a single web-like preform, which is provided by being arranged for instance in a U-shaped manner between opened parts of the blow molding tool. The extrusion of one or more preforms may take place for example by means of an extrusion head arranged above a blow molding tool, in a manner in which it is hanging down in the direction of gravitational force. Alternatively, one or more preforms may be provided by means of a handling device on the blow molding tool.

Coming into consideration with preference as extrudates are co-extrudates of thermoplastic material. These co-extrudates may comprise barrier layers for hydrocarbons. Within the scope of the invention, however, the processing of preforms with single-layer extrudates is also possible. With preference, the preforms are extruded on the basis of HDPE. For example, six-layer extrudates with HDPE as the base material and EVOH as the barrier material come into consideration.

In a further preferred refinement, the method comprises the continuous extrusion of at least two two-dimensional, web-like preforms in the direction of gravitational force above the opened parts of the blow molding tool that is used.

For the purposes of the invention, a blow molding tool should be understood as meaning a tool with multiple mold parts formed so as to complement one another, which in each case have at least one cavity that defines the later outer contour of the hollow body to be produced. In the closed state, the cavities of the blow molding tool define a mold cavity, the contour of which corresponds to the lateral surface of the hollow body to be produced.

With preference, the molding of the preform into a shell takes place by using the first heat of the extrudate, i.e. by using the heat of plastication from the extrusion.

The joining of the insert to at least one shell takes place for example by welding and/or riveting the insert to the side of the shell concerned that is facing the main volume of the hollow body to be produced.

A venting system for the hollow body, comprising venting valves, at least one venting line and at least one bubble vessel (liquid trap), may be provided for example as the insert or inserts.

If a venting system for the hollow body is to be provided as the insert or inserts, it may be provided that, for example when venting valves are being joined to a shell within the blow molding tool by a connection fitting or a connection nipple, the container wall is pierced, in order to allow it to be connected from the outside after completion of the container. In the case of such piercing of the container wall, a pressure equalization may take place, for example by way of a bypass line which is connected to the main volume and connects the part-volume for example in the region of a die or depression in the tool that serves for receiving the connection nipple for the valve.

In the case of an alternative variant of the method according to the invention, it may be envisaged to provide a part-volume of the insert with a valve which is open during the joining of the insert and which can be brought into the closed position by means of magnets, compressed air or by means of a mechanical actuation after completion of the hollow body.

In the case of a particularly expedient and advantageous variant of the method according to the invention, it is provided that the connecting of the part-volume takes place by means of at least one inflation needle or at least one inflating mandrel, with which a wall of the insert is pierced. This may take place for example after the insert has been joined to the shell concerned.

For example, the connecting of the part-volume may take place by way of at least two inflation needles that are connected to one another by way of at least one bypass line, one inflation needle being made to pierce through the wall of the insert and a further inflation needle being made to pierce through a wall of the hollow body. This piercing is also referred to hereinafter as firing in of the inflation needle, a term that has been adopted as a specialist term.

Since, when introducing venting systems for example into the hollow body, the volumes of the venting systems that come into question are usually relatively small, a good pressure equalization can be achieved even with relatively small bypass cross sections.

In the case of an expedient variant of the method according to the invention, it is provided that the inflation needle piercing the insert is made to pierce through the wall of the hollow body from the outside, preferably in a region of a connection opening to be produced in the container wall.

In the case of the production of a fuel tank, the venting lines, or bubble vessels possibly to be provided on the container wall, usually have to be provided from the outside with a connection nipple or the like, onto which a line to be laid outside the fuel tank/hollow body is connected. Piercing of the wall of the hollow body and the wall of the insert expediently takes place in such a region of the wall of the hollow body in which such a connection opening or an aperture is to be produced later.

In order to counteract as far as possible the situation where the piercing of an insert that has just been joined onto the shell concerned may cause mechanical loading of the joined connection/welded connection/riveted connection, it is provided in the case of a particularly preferred variant of the method that, before the joining of the insert, the wall of at least one shell is pierced with at least two inflating mandrels or inflation needles, which communicate with one another by way of at least one bypass line, and that during the joining the insert is pierced by an inflation needle by using a joining movement.

In the case of such a variant of the method, it may be provided for example that an application of pressure to the hollow body in the blow molding tool takes place in two stages, a first, lower preliminary blowing pressure being applied before the joining of the insert, by way of the inflation needles communicating with one another by way of the bypass line.

This has the advantage that it is ensured by the preliminary blowing operation either that there are no blockages of the inflation needles, caused by the firing in, or that any blockages are removed.

In order to be able to accomplish preliminary blowing by way of the bypass line, there may for example be a change-over valve integrated in the bypass line, between the inflation needles, by way of which valve a gaseous medium can be introduced as a pressure medium into the main volume.

The method is explained below by way of example with reference to FIG. 1 of the drawings.

The method is carried out with the aid of a blow molding tool and at least one extrusion head. The blow molding tool comprises in a known way at least two blow mold halves, which are fastened to platens and can be displaced away from one another and toward one another in the sense of an opening and closing movement. In addition, for carrying out the displacement, the blow molding tool comprises at least one central frame, or a tool divider that can be displaced between the blow mold halves.

In the case of the method according to the invention, for example two web-like preforms are first extruded between the opened parts of the blow molding tool. In a first method step, in which the halves of the blow molding tool are displaced against a tool divider or a central tool or central frame, these preforms may then be drawn into the cavities of the blow molding tool, for example just by applying negative pressure in the cavities of the blow molding tool or by preliminary blowing of a pressure medium at a first, lower preliminary blowing pressure.

After the shaping of the preforms into shells, as still warm-plastic intermediate products, the blow molding tool is opened again. At least one insert is joined onto at least one of the shells, while the shell is still in the opened blow molding tool. The joining takes place either by means of a manipulator or by way of an insert carrier, it being possible for the joining to take place by using a displacing movement of the blow molding tool or exclusively on the basis of a handling movement of the insert.

As already explained above, joining is understood for the purposes of the present invention as meaning either welding or riveting or a combination of these types of fastening. After the joining of the insert, an insert carrier that may have been brought between the halves of the blow molding tool is removed, the blow molding tool is closed and blow molding is completed, the shells that are arranged in the cavities being peripherally welded to one another by applying a corresponding closing pressure of the parts of the blow molding tool that have been brought against one another. The application of pressure to the main volume of the hollow body takes place in this case when a preferably gaseous pressure medium is introduced by means of an inflating mandrel or an inflation needle fired into the still warm-plastic hollow body. The inflating mandrel or inflation needle is integrated in the blow molding tool in a known way.

Either a carriage that can be brought between the blow mold halves or a central tool, central frame or the like may be provided as the insert carrier.

BRIEF DESCRIPTION OF THE DRAWINGS

The disclosure hereinafter will be described with reference to the accompanying drawing in which:

FIG. 1 shows a hollow body 1 in the form of a fuel tank according to the present invention directly after the joining together of shells 2 within a blow molding tool 3.

DETAILED DESCRIPTION

FIG. 1 shows a hollow body 1 in the form of a fuel tank according to the present invention directly after the joining together of shells 2 within a blow molding tool 3. The blow molding tool 3 is represented in a highly schematically simplified form. Within the hollow body 1, parts of a venting system are represented in the form of a bubble vessel 4 and a valve 6 connected to the bubble vessel 4 by way of a venting line 5. Both the bubble vessel 4 and the valve 6 have been welded to a shell 2 directly after the shaping of the shells 2 in part-cavities 3a, 3b of the blow molding tool 3. After removal of the hollow body 1 from the blow molding tool 3, the bubble vessel 4 is connected by way of a lead-through in the wall of the hollow body 1 to a venting line laid outside the hollow body 1.

The hollow space enclosed by the hollow body 1 is referred to hereinafter as the main volume 7, the volume enclosed by the bubble vessel 4 is referred to hereinafter as the part-volume 8.

In the region of an inspection opening 9, which is represented in an indicative manner in FIG. 1 and is obtained by cutting out a circle after removal of the hollow body 1 from the blow molding tool 3, the hollow body 1 is provided with a molded-in metal flange ring, which is not represented. The molding-in of this flange ring in the region of the inspection opening takes place in the last method step of the production method by applying a gas pressure to the main volume 7 of the hollow body 1 at an increased internal pressure of approximately 6 to 10 bar. This "final blow molding" of the hollow body 1 takes place by way of at least one inflation needle 10, which is fired into the still warm-plastic hollow body 1 within the blow molding tool in the region of the inspection opening 9. The venting system comprising the bubble vessel 4, the venting line 5 and the valve 6 is of course thereby likewise subjected to pressure if this venting system in the installed state is formed as a self-contained part-volume 8, the connecting of which does not take place until after removal of the hollow body 1 from the blow molding tool 3.

In order to achieve a pressure equalization during the final blow molding of the hollow body 1, it is therefore envisaged to fire into the hollow body 1 a second and third inflation needle 11, 12, which communicate with one another by way of a bypass line 13. The second inflation needle 11 penetrates the shell 2 as well as the wall of the bubble vessel 4 joined onto the shell 2. The third inflation needle 12 is fired into the hollow body 1 in the region of the later inspection opening 9 through the wall of the hollow body 1 or through the shell 2. A pressure equalization between the main volume 7 and the part-volume 8 takes place by way of the bypass line 13, so that in this way collapsing, for example of the bubble vessel 4, is reliably prevented. The firing in of the second and third inflation needles may in this case take place directly after the joining together of the shells 2.

As an alternative to the variant of the method described above, it may be envisaged to fire in the second and third inflation needles 11, 12 already directly after the shaping of the shells 2 in the blow molding tool 3 and to bring about a preliminary blow molding of the not yet joined shell 2 by way of the bypass line 13. In this stage of the method, the halves of the blow molding tool are for example respectively sealed off from a tool divider, a core or a central frame.

It goes without saying that the invention should be understood as meaning that the pressure equalization between a part-volume 8 and the main volume 7 of the hollow body 1 may take place at any desired location and at multiple locations of the hollow body 1, for example including on both shells 2.

After the preliminary blow molding, the bubble vessel 4 for example can then be joined onto the shell 2 concerned by the already fired-in second inflation needle 11 piercing through. Then, the shells 2 can be joined together and an application of gas pressure to the hollow body 1 can take place for the purpose of "final blow molding".

The introduction of the third inflation needle 12 in the region of the later inspection opening 9 is not detrimental to the finished hollow body 1 as long as cutting out of a circle in the wall of the hollow body is performed there.

LIST OF DESIGNATIONS

1 Hollow body
2 Shells
3 Blow molding tool
3a, 3b Part-cavities of the blow molding tool
4 Bubble vessel 5 Venting line
6 Valve
7 Main volume
8 Part-volume
9 Inspection opening
10 Inflation needle
11 Second inflation needle
12 Third inflation needle
13 Bypass line

What is claimed is:

1. A method for producing a hollow body from thermoplastic material, comprising:
    providing at least one preform of thermoplastic material on a multipart blow molding tool,
    introducing the at least one preform into cavities of the blow molding tool,
    molding the at least one preform into shells within the blow molding tool,
    joining at least one insert to at least one shell of the shells within the blow molding tool, the insert defining a part-volume that is closed off with respect to a main-volume of the hollow body to be produced,
    joining together the shells by closing the blow molding tool,
    forming the hollow body with the insert enclosed within the hollow body between the shells,
    applying pressure to the main-volume enclosed by the hollow body, wherein a pressure equalization with the part-volume is brought about parallel to the pressure applied to the main-volume,
    wherein the pressure equalization takes place by the part-volume within the closed blow molding tool being connected initially for a time to the main-volume by at least one bypass line and by at least one inflation needle or an inflating mandrel, with which a wall of the insert and/or of the hollow body is pierced.

2. The method as claimed in claim 1, wherein the connecting of the part-volume to the main volume takes place by the at least one inflation needle being connected to the at least one bypass line, the inflation needle being made to pierce through the wall of the insert and/or of the hollow body.

3. The method as claimed in claim 1, wherein the at least one inflation needle comprises at least two inflation needles, and the connecting of the part-volume to the main volume takes place by the at least two inflation needles being connected to one another by the at least one bypass line, one inflation needle of the at least two inflation needles being made to pierce through the wall of the insert and a further inflation needle of the at least two inflation needles being made to pierce through a wall of the hollow body.

4. The method as claimed in claim 3, wherein the inflation needle being made to pierce through the wall of the insert is made to pierce through the wall of the hollow body from the outside.

5. The method as claimed in claim 1, wherein the at least one inflation needle or inflating mandrel comprises at least two inflation needles or inflating mandrels, and, before the joining of the insert, a wall of at least one shell which provides the wall of the hollow body is pierced with the at least two inflating mandrels or inflation needles, which communicate with one another by at least one bypass line, and in that during the joining of the insert, the insert is pierced by one of the inflation needles or inflating mandrels by using a joining movement.

6. The method as claimed in claim 5, wherein an application of pressure to the hollow body takes place in two stages, including a first, preliminary blowing pressure being applied before the joining of the insert, by the inflation needles communicating with one another by the bypass line.

7. The method as claimed in claim 4, wherein the inflation needle piercing the insert is made to pierce through the wall of the hollow body from the outside in a region of a connection opening to be produced in the wall of the hollow body after removal from the blow molding tool.

8. The method as claimed in claim 1, wherein the insert is part of a venting system.

9. The method as claimed in claim 1, wherein the insert comprises a valve.

10. The method as claimed in claim 1, wherein the insert comprises a venting line.

11. The method as claimed in claim 1, wherein the insert comprises a bubble vessel.

12. The method as claimed in claim 1, wherein the insert comprises an expansion tank.

13. The method as claimed in claim 1, wherein the pressure equalization avoids destruction of the insert by the pressure applied to the main volume.

* * * * *